(12) United States Patent
Trinick

(10) Patent No.: US 10,751,787 B2
(45) Date of Patent: *Aug. 25, 2020

(54) METHOD FOR FORMING A JOINT USING A SELF-PIERCING RIVET

(71) Applicant: Atlas Copco IAS UK Limited, Deeside, Flintshire (GB)

(72) Inventor: Russell John Trinick, Mold (GB)

(73) Assignee: Atlas Copco IAS UK Limited, Flintshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/988,665

(22) Filed: May 24, 2018

(65) Prior Publication Data

US 2018/0311721 A1  Nov. 1, 2018

Related U.S. Application Data

(63) Continuation of application No. 14/414,970, filed as application No. PCT/GB2013/051879 on Jul. 15, 2013, now Pat. No. 10,005,120.

(30) Foreign Application Priority Data

Jul. 16, 2012  (GB) .................................. 1212631.4
Jul. 19, 2012  (GB) .................................. 1212844.3

(51) Int. Cl.
*B21J 15/02*  (2006.01)
*F16B 5/04*  (2006.01)
(Continued)

(52) U.S. Cl.
CPC ............. *B21J 15/025* (2013.01); *B21J 15/36* (2013.01); *F16B 5/04* (2013.01); *F16B 19/086* (2013.01); *Y10T 29/49943* (2015.01)

(58) Field of Classification Search
CPC . B21J 15/025; B21J 15/36; F16B 5/04; F16B 19/086; Y10T 29/49943
See application file for complete search history.

(56) References Cited

U.S. PATENT DOCUMENTS 3,983,304 A   9/1976  Sekhon
6,108,890 A   8/2000  Opper et al.
(Continued)

FOREIGN PATENT DOCUMENTS

DE   19648231 A    5/1998
EP   0129358 A2   12/1984
(Continued)

OTHER PUBLICATIONS

Chinese Office Action from Chinese Application No. 2013800378428 dated Jun. 20, 2016.
(Continued)

*Primary Examiner* — John C Hong
(74) *Attorney, Agent, or Firm* — SmithAmundsen LLC

(57) ABSTRACT

A joint is formed in a stack of at least two sheets of light metal alloy, using a self-piercing rivet that is fully hollow. The rivet is coated at least along a portion of its bore by a lubricant and pierces the upper surface thereof and such that the shank deforms outwardly to interlock with the materials but without penetration to the die side of the material. The outside diameter of the shank of the rivet is 5.4 mm or less. The die has a volume that is less than 60% or 70% of the effective solid volume of the rivet.

22 Claims, 8 Drawing Sheets

(51) Int. Cl.
*B21J 15/36* (2006.01)
*F16B 19/08* (2006.01)

(56) References Cited

U.S. PATENT DOCUMENTS

| | | | | |
|---|---|---|---|---|
| 10,005,120 | B2 * | 6/2018 | Trinick | ............... B21J 15/025 |
| 2002/0048487 | A1 | 4/2002 | Mauer et al. | |

FOREIGN PATENT DOCUMENTS

| | | | |
|---|---|---|---|
| EP | 1078701 | A2 | 2/2001 |
| JP | H09-317730 | A | 12/1997 |
| JP | 11-90853 | A | 6/1999 |
| JP | 2958272 | B2 | 10/1999 |
| JP | 2001-132719 | A | 5/2001 |
| JP | 2003-106316 | A | 4/2003 |
| JP | 2007-127278 | | 5/2007 |
| JP | 2008-267594 | A | 11/2008 |
| JP | 2009-142889 | A | 7/2009 |
| JP | 2010-188383 | A | 9/2010 |
| JP | 2011-212700 | A | 10/2011 |
| WO | WO2012/063012 | | 5/2012 |
| WO | WO2014/013232 | A1 | 1/2014 |

OTHER PUBLICATIONS

English Translation of Chinese Office Action from Chinese Application No. 2013800378428 dated Jun. 20, 2016.
International Search Report and Written Opinion from PCT/GB2013/051879 dated Oct. 11, 2013.
International Preliminary Report on Patentability from PCT/GB2013/051879 dated Jan. 20, 2015.
English Translation of JP 2003-106316A published on Apr. 9, 2003.
English Translation of EP 1078701 A2 published on Feb 28., 2001.
Japanese Office Action from Japanese Application No. 2015-522161 dated Jun. 20, 2016.
English Translation of Japanese Office Action from Japanese Application No. 2015-522161 dated Jun. 20, 2016.
Korean Office Action from Korean Application No. 2017-7003568 dated Mar. 16, 2017.
English Translation of Korean Office Action from Korean Application No. 2017-019222640 dated Mar. 16, 2017.
English Abstract and Machine English Translation of JP2007-127278A published May 24, 2007.
English Abstract and Machine English Translation of Jp H09-317730A published Dec. 9, 1997.
English Abstract and Machine English Translation of JP2008-267594A published Nov. 6, 2008.
English Abstract of JP 2010-188383A published Sep. 2, 2010.
English Abstract of JP 2001-132719A published May 18, 2001.
English Abstract of JP 2009-142889A published Jul. 2, 2009.
English Abstract of JP 2011-212700A published Oct. 27, 2011.
European Office Action from European Application No. 13740051.1 dated Aug. 1, 2017.
English Translation of DE 19648231 A1 published May 28, 1998.
English Translation Abstract of JP 2958272 B2 published Oct. 6, 1999.
Decision of Dismissal of Amendment from the Korean Intellectual Property Office dated Mar. 13, 2018 for Application No. 10-2017-7003568.
English translation of Decision of Dismissal of Amendment from the Korean Intellectual Property Office dated Mar. 13, 2018 for Application No. 10-2017-7003568.
Decision of Rejection from the Korean Intellectual Property Office dated Mar. 13, 2018 for Application No. 10-2017-7003568.
English translation Decision of Rejection from the Korean Intellectual Property Office dated Mar. 13, 2018 for Application No. 10-2017-7003568.

* cited by examiner

METHOD FOR FORMING A JOINT USING A SELF-PIERCING RIVET

CROSS REFERENCE TO RELATED APPLICATIONS

This application is a continuation of U.S. application Ser. No. 14/414,970, filed on Jan. 15, 2015, currently pending, which is a U.S. National Stage Application of International Application No. PCT/GB2013/051879, filed Jul. 15, 2013, which claims priority from United Kingdom Patent Application No. 1212631.4, filed Jul. 16, 2012, and United Kingdom Patent Application No. 1212844.3, filed Jul. 19, 2012. The entirety of all the above-listed applications are incorporated herein by reference.

The present invention relates to a method for forming a joint with a self-piercing rivet whereby the rivet is inserted into sheet material without full penetration such that a deformed end of the rivet remains encapsulated by an upset annulus of the sheet material.

A self-piercing rivet generally has a head and a partially hollow shank. It is driven by a punch into the sheet material such that it pierces the top sheet or sheets and forms a mechanical interlock with the bottom sheet with the head often (but not always) flush with the upper surface of the top sheet. Since the bottom sheet is not pierced, through being formed into a die, there is a reduced risk of corrosion occurring in the completed joint. Using self-piercing rivets in a joining process reduces the number of production steps as compared to conventional riveting in which a hole first has to be drilled into the sheet material before the rivet is inserted and then its projecting ends upset.

Self-piercing riveting, often in combination with adhesive, has been used to great commercial success in the automobile industry where light-weight materials, such as aluminium, have been adopted for vehicle body panels and other components in the interests of weight reduction and therefore reduced energy consumption. It is difficult, or not feasible, to spot weld aluminium, particularly to steel, owing to its high thermal conductivity, low melting range and propensity to form oxide surface film.

More recently in the automotive industry there has been a move towards using high strength sheet metals. Our European patent no. 2024651 describes a self-piercing rivet particularly suitable for joining high strength, thick stack steels. Since such steels have a high ultimate tensile strength the insertion forces applied to the rivet are necessarily high there is thus a significant risk of rivet collapse. The rivets must be heat treated to give them a medium/high hardness value (e.g. 450-580 Hv) so that they have sufficient strength. It has been established that such a rivet is not always suitable for use with thick stack, high strength light metal alloys such as magnesium and aluminium alloys especially where the material combination may have three or more layers. Moreover, other conventional rivets are not generally suitable for joining such materials.

Aluminium alloy sheet material generally exhibits superior ductility and so dies with relatively deep cavities tend to be used. However when such dies are used with stronger materials such as high strength aluminium or magnesium alloys the joints suffer from the tendency for the middle sheets to push through the lowermost sheet in the insertion process. This leaves a weakened joint which is often prone to corrosion and it may not be possible to produce a satisfactory joint repeatedly in a mass production environment.

Thick stack, light metal alloys such as magnesium or higher strength aluminium exhibit relatively low ductility and thus have a tendency to fracture when riveted using self-piercing rivets and conventional dies. Components comprising thick stack joints, e.g. automobile shock towers or crash members, are sometimes produced by casting or extrusion, this being a more economical and/or efficient in terms of design and/or manufacture. The "button" of material that is deformed into the die tears or cracks during the rivet insertion process. This is undesirable as the finished joint is weakened and prone to corrosion. Moreover, it has been found that there is a tendency for the end of the rivet shank to drag sheet material down through the joint to such an extent that it is pushed through and out of the lowermost sheet, resulting in a joint that is prone to corrosion and may also be considered unacceptable in aesthetic appearance. In the process of being dragged down the sheet material thins excessively and is prone to tearing or cracking. This results in a loss of interlock and reduces the strength of the joint. Furthermore, the sheet material that has been dragged down may wrap around the piercing end of the rivet shank rather than being penetrated. This results in reduced peel strength. A die with a relatively small volume die cavity (i.e. a shallow die) may be used in order to avoid tearing or cracking. However, a reduction in the die depth serves to increase the force experienced by the rivet during insertion, thereby subjecting the joint, die and riveting tool to greater stress. This is undesirable for the rivet in that it may cause buckling or fracture giving the finished joint an inconsistent or unacceptable form quality or strength. Reduction in die depth or other alterations to the die volume or form, especially with the corresponding increased force, may also result in greater tendency for material from the lower stack component to become detached and remain in the die as the joined component is removed from the die as there is a tendency for the die to grip the component as a result of the compacting of the material in the die by the riveting process. This tendency may be exacerbated if tearing or cracking has been initiated during the rivet insertion process but it may occur even without the initiation of such tearing or cracking. Whilst countermeasures such as polishing or die surface treatments are possible to address the problem of retained material, the increased stress imparted by virtue of the greater rivet insertion force may reduce the life of the die, the punch and/or other parts of the riveting tool.

It has been established that other existing rivets are also not generally suitable for joining relatively thick stacks of higher strength, light metal alloys. The higher strength and low ductility of such material generally means that the rivet experiences higher stress during the joining operation and this is compounded when a shallow die is used. Conventional self-piercing rivets are not capable of withstanding these high stresses in such a manner that the deformation of the rivet shank remains controllable to ensure the final joint is of satisfactory quality. Simply manufacturing the rivet from a higher strength material does not generally achieve the desired results as the corresponding reduced ductility can cause the rivet shank to crack as it attempts to deform during insertion. In order to form a suitable joint with satisfactory strength and corrosion resistance the shank of the rivet needs to have sufficient column strength to pierce the top sheet of material without buckling but yet flare outwardly during insertion in a repeatable and predictable manner without tearing or cracking.

One typical approach to strengthening the shank of a self-piercing rivet is to increase its thickness but this increases the tendency of the shank to crack during insertion of the rivet. Another approach is to increase the depth of rivet material below the head (known as the rivet "web") thus reducing the length of the unsupported hollow part (the bore) of the shank but this is counter-productive as the volume of sheet material displaced by the rivet is less readily accommodated within the bore leading to the detrimental effects discussed above. The relatively low ductility of the rivet material only allows for limited deformation and displacement of material before it tends to crack rendering it susceptible to fatigue. In view of this, self-piercing rivets are not successfully used in thick stack, high strength light alloy applications. A further approach is to increase the hardness of the rivet material but this only increases the tendency of the rivet to fracture as the shank deforms outwardly during the joining process.

It is desirable to produce self-piercing riveted joints in the high strength materials without having to increase significantly the setting forces required to ensure the rivet is inserted fully. Increase of the setting forces involves greater energy consumption and therefore increased cost and reduces the life of the riveting equipment such as, for example, the punch and the die. Moreover, the commercially available riveting tools are limited in their setting force capacity. Such riveting tools are designed to have the capacity to insert many different types of self-piercing rivets into different kinds of materials and are expensive to replace. If such tools were replaced with designs that were capable of producing higher forces (whilst providing acceptable performance in other respects) the replacement tools would very likely have to be larger and heavier requiring the use of replacement robots with the capacity to handle the increased load. Such robots would be more expensive thereby compelling automotive manufacturers to design more costly production lines that take up greater space. It is therefore desirable that joints are produced with setting force magnitudes that are within the capacity of existing rivet setters (typically around 50 kN).

It is one object of the present invention to obviate or mitigate the aforesaid disadvantages. It is also an object of the present invention to provide for an improved or alternative method for forming a joint with a self-piercing rivet.

According to a first aspect of the present invention there is provided a method for forming a joint in a stack of at least two sheets of material, at least one of the sheets being a light metal alloy, using a self-piercing rivet comprising the steps of: positioning the material over a die; providing a substantially cylindrical self-piercing rivet that is fully hollow so as to define a bore that extends along its entire length, the rivet having been coated at least along a portion of its bore by a lubricant; positioning the rivet over the sheet material at a position opposite the die; using a punch to set the rivet and force it into the sheet material such that it pierces the upper surface thereof and such that a shank of the rivet deforms outwardly to interlock with the material but without penetration to the die side of the material; wherein the rivet has a shank with an outside diameter of 5.4 mm or less, and the die has a volume that is 60% or less of the effective solid volume of the rivet.

The invention thus enables the use of lower volume dies with light metal alloys that have relatively low ductility. The use of a lubricant ensures that, when such lower volume dies are used the joints can still be manufactured using conventional setting force magnitudes even when the rivet has a countersunk head. A countersunk head is one that is designed to be embedded in the upper sheet of material so that the upper surface of the rivet head lies substantially flush with the upper surface of the upper sheet of material in the finished joint. When setting such a rivet a significant proportion of the setting force is required at the end of the rivet insertion process to ensure the head is embedded in the upper sheet as described.

In one embodiment the outside diameter of the rivet shank may be 5.4 mm, 5.3 mm or 5.2 mm. The diameter of the bore may be at least 3.1 mm and may be 3.2 mm or 3.3 mm. This provides for a rivet with a relatively thin shank wall and therefore a relatively low (but adequate) column strength.

In another embodiment the outside diameter of the rivet shank may be 3.35 (+/−0.1 mm) and the diameter of the bore may be 2.1 mm (+/−0.1 mm). Such a rivet may be particularly suited for use with a substantially flat die.

The sheets may have an ultimate tensile strength in the range 50-600 MPa and preferably in the range 180 MPa-600 MPa. For example they may be a high strength aluminium alloy having an ultimate tensile strength in the range 330-600 MPa. Alternatively they may be wrought magnesium alloy having an ultimate tensile strength in the range 180-440 MPa. It will be appreciated that the sheets of the joint may be made from different materials, with at least one of the sheets being a light metal alloy or each sheet in the stack being a light metal alloy but not necessarily the same as the other sheets in the stack.

The sheets may be produced by conventional rolling, casting or extrusion processes combined with hardening or strengthening processes such as heat treatment or age hardening.

The die may have a die cavity with a maximum depth in the range 0.5 mm to 2.0 mm.

The stack of sheet material may have a thickness of at least 6.0 mm, or of at least 3.0 mm, or of at least 1.0 mm.

The rivet may be coated with lubricant along the full length of its bore. It may also be coated on at least part of the exterior surface of a shank of the rivet. The lubricant may be of any suitable substance such as, for example, a dry film.

The lubricant may comprise a binder resin and one or more suitable lubricant materials such as, for example, graphite, molybdenum disulphide, PTFE or phosphate.

The lubricant may be applied on an internal surface of the rivet that defines the bore and/or may be applied to an external surface of the shank. The lubricant may be applied in any convenient manner. For example, it may be inserted into the bore from one end in a droplet or spray form. The amount may be metered so that it is not necessary to adopt a process for removing excess lubricant. In an alternative example, the lubricant may be applied by dipping all or part of the rivet into a lubricant reservoir. The rivet may be dipped at one end only. The dipping process may serve to coat one or both of the interior surface (which defines the bore) and the external surface of the rivet.

It will be understood that the rivet may be of fastener grade steel such as, for example, carbon-manganese boron steel confirming to BS EN 10263:2001, steel grade 36MnB4. The rivet may have a hardness of 250-600 Hv. In a preferred embodiment it has a hardness in the range 280-560 Hv.

The rivet may have a head with a diameter that is larger than that of the shank. The head may be designed to finish flush with the top surface of the uppermost sheet in the stack of material (e.g. a countersunk head rivet) or it may be designed to stand proud from that surface (e.g. a pan-head rivet).

The method may further comprise allowing a slug of the uppermost sheet of material to deform as it reaches the top of the bore, the material being deformed such that it is directed outwardly towards an upper portion of the surface defining the bore. The upper portion of the surface may exhibit a groove or any other suitable recess or feature with which the slug engages and thereby inhibits any tendency for the slug to pass out of the top of the rivet. There may be a projection on the end of the punch for further deforming the slug of material. The groove or recess may be annular or partly annular.

According to a second aspect of the present invention there is provided a method for manufacturing a component or product, such as for example a car body panel, including forming a joint in accordance with the method of forming a joint as described above.

According to a third aspect of the present invention there is provided a method for forming a joint in a stack of at least two sheets material, at least one of the sheets being a light metal alloy, using a self-piercing rivet comprising the steps of: positioning the material over a die; providing a substantially cylindrical self-piercing rivet that is fully hollow so as to define a bore that extends along its entire length, the rivet having been coated at least along a portion of its bore by a lubricant; positioning the rivet over the sheet material at a position opposite the die; using a punch to set the rivet and force it into the sheet material such that it pierces the upper surface thereof and such that a shank of the rivet deforms outwardly to interlock with the material but without penetration to the die side of the material; wherein the die has a volume that is 70% or less of the effective solid volume of the rivet.

The die volume may be 60% or less of the effective solid volume of the rivet.

This aspect of the present invention may be combined with any of the features referred to above.

At least one of the sheets may be made from a polymeric or plastics material.

According to a fourth aspect of the present invention there is provided a method for manufacturing a component or product, such as for example a car body panel, including forming a joint in accordance with the method of the third aspect of the present invention.

Specific embodiments of the present invention will now be described, by way of example only, with reference to the accompanying drawings in which.

Figure 4A:
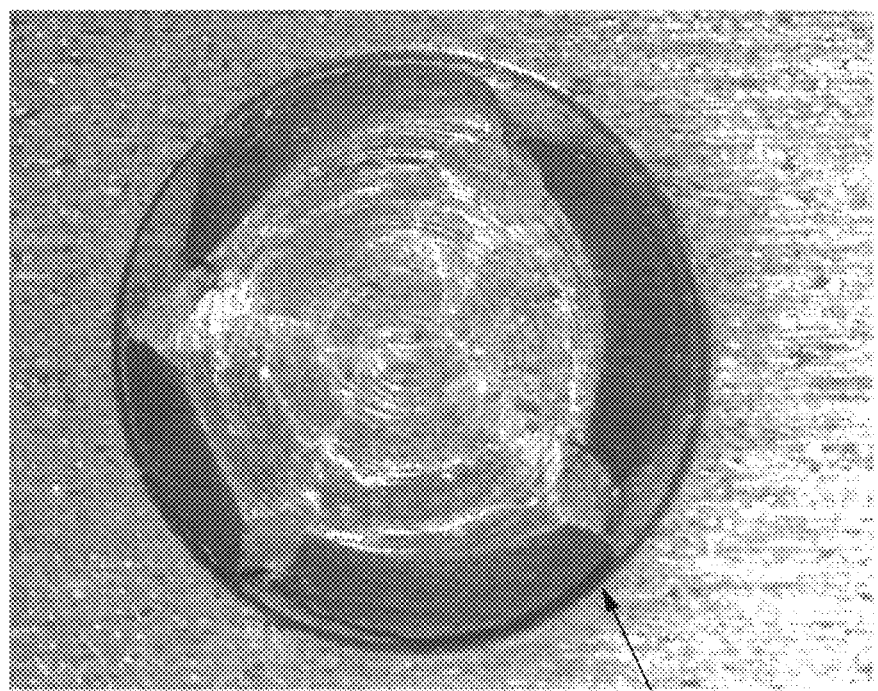
Figure 4B:
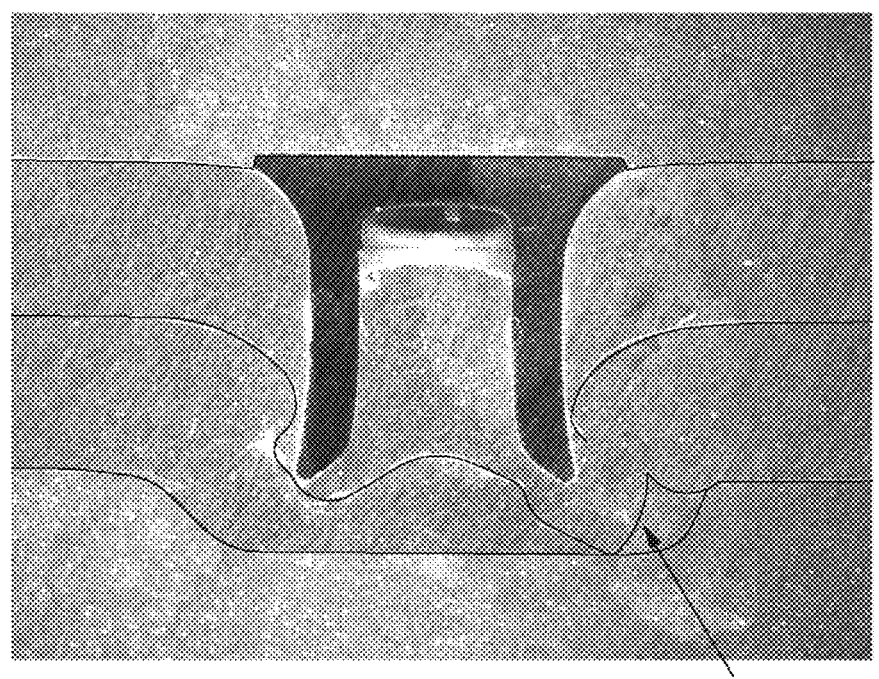
Figure 5A:
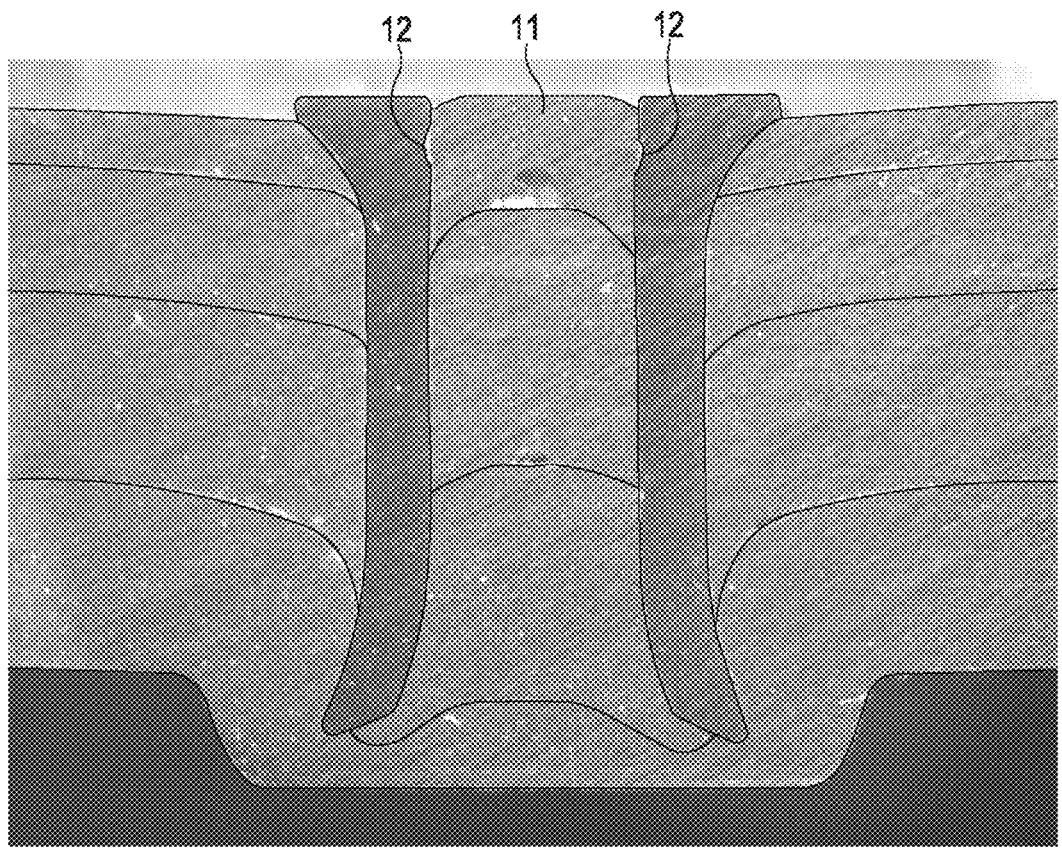
Figure 5B:
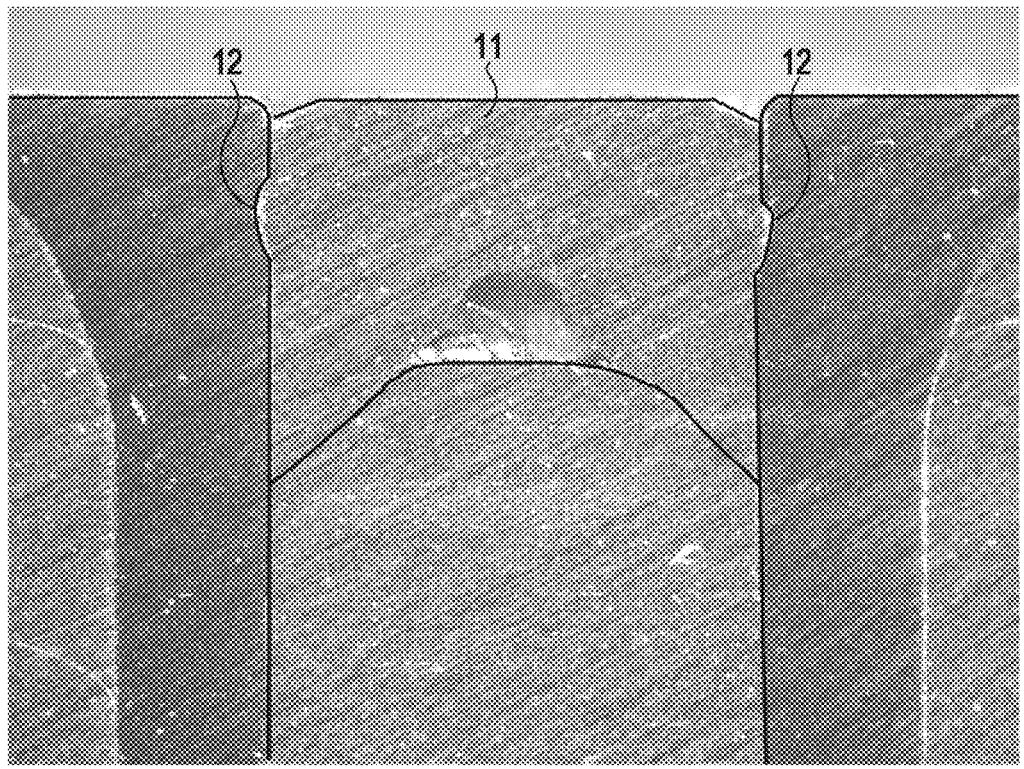

FIGS. 4a-4d show plan view and sectioned views for two riveted joints prepared for comparative purposes: FIGS. 4a and 4b showing a self-piercing rivet method according to the prior art and the FIGS. 4c and 4d using a self-piercing rivet method in accordance with a third embodiment of the present invention; and FIG. 5a is a sectioned view of a joint in accordance with the present invention showing the upper portion of a rivet designed to prevent or inhibit a slug of material inside the rivet bore from become dislodged;

FIG. 5b is a magnified view of an upper portion of the joint of FIG. 5a; and

Figure 5C:
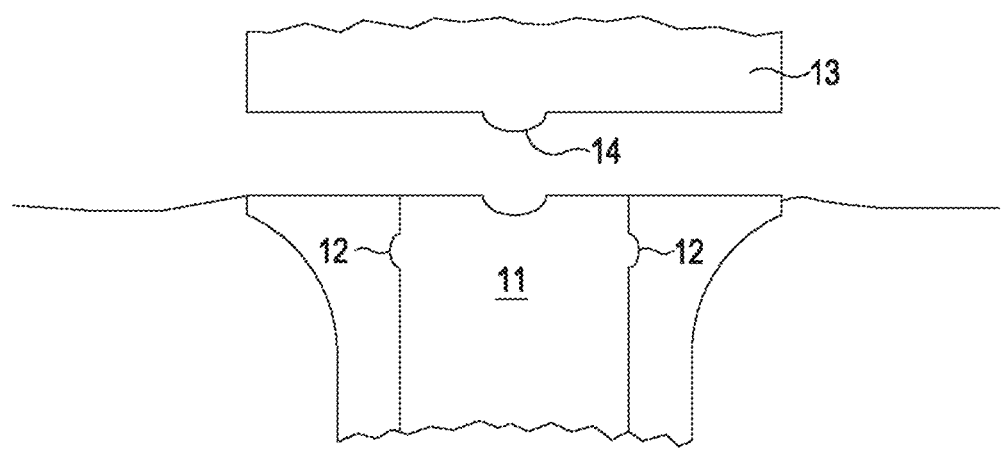

FIG. 5c is a schematic representation of an embodiment of a method for producing the joint of FIGS. 5a and 5b.

Figure 1:
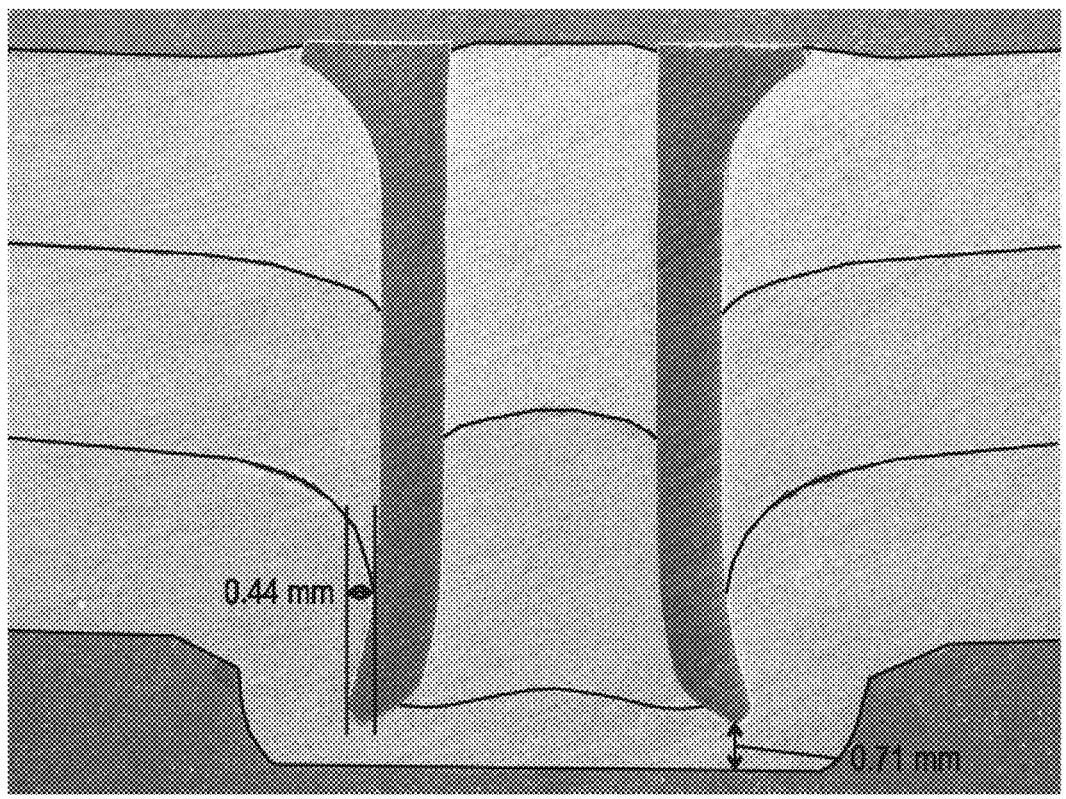
FIG. 1 is a sectioned view of a riveted joint using a self-piercing rivet produced according to the method of the present invention.

Referring now to FIG. 1 of the drawings, there is shown a joint formed in a stack of three sheets of high strength aluminium alloy (6111-T4) by a self-piercing rivet.

In this particular example, the rivet has been inserted using an electric rivet setter of the kind described in U.S. Pat. No. 6,951,052 and using a clamping regime described in U.S. Pat. No. 6,742,235. The joint has been formed using a die with a maximum depth of 1.8 mm and having a diameter of 10 mm. The setting velocity was 350 mm/sec.

The rivet is substantially cylindrical and fully hollow, that is, it has a central bore that it open at both ends, an outside diameter of 5.3 mm (+/−0.1 mm) and an inside diameter of 3.2 mm (+/−0.1 mm). At its upper end the rivet has countersunk head defined by an annular projection at its outer periphery to provide an increased diameter of 7.75 mm thus providing sufficient area for contact by a driving punch of the rivet setter. The inside of the bore is mechanically plated at the head end to a short distance of approximately 0.5 to 1 mm. The bore is also coated, along its full length, with a dry film lubricant by dipping the rivet in the lubricant in liquid form, spinning the rivet in a centrifuge or the like to remove excess liquid and allowing the lubricant to dry as a film. One example of a commercially available film lubricant is Gleitmo 625 available from Fuchs Lubritech GmbH of Kaiserslauten, Germany.

From a simple visual inspection of the image of FIG. 1 it can be seen that a satisfactory joint has been produced. In particular, the rivet demonstrates sufficient column strength and exhibits no asymmetry or partial collapse. The rivet has pierced through the upper and intermediate sheets but not the lowermost sheet with which it has interlocked sufficiently so as to produce a robust joint. The degree of interlock is represented by the measurement of 0.44 mm shown in FIG. 1. There is no evidence of the second sheet pushing through the lowermost sheet. The thickness of the lowermost sheet in the joint is shown as 0.71 mm, which is considered a satisfactory depth. It can be seen that the aluminium has flowed to the top of the bore. The lubricant has served to reduce the stresses encountered by the rivet in the setting operation induced by friction thereby allowing the sheet material to flow to the top of the bore. The "button" of material that is formed into the die has not torn or cracked during the rivet insertion process. The result is not only a joint that is aesthetically acceptable but also ensures that the exposed part of the bore at the head end is restricted to a depth where the plating provides corrosion protection. In the absence of a lubricant it was found that the same rivet would experience greater stress and would tend to become compressed resulting in an asymmetric form in the final joint. In addition, the sheet material would only flow part way up the rivet bore thereby rendering the joint susceptible to corrosion.

The use of a fully hollow rivet of this kind affords a relatively large bore volume that can accommodate a larger percentage of displaced sheet material. This allows the use of a relatively shallow die that reduces the tendency for the intermediate sheets to be dragged down and through the lowermost sheet. Moreover, the tendency of such sheets to wrap around the piercing end of the rivet is reduced. In the particular example shown in FIG. 1, the fully hollow rivet is capable of accommodating 81% more displaced sheet material than a conventional self-piercing rivet.

With an outer diameter of 5.3 mm and an inside diameter of 3.2 mm, the total shank thickness across the diameter of the rivet of FIG. 1 is 2.1 mm, i.e. the radial thickness of the shank wall is 1.05 mm. Such a rivet, with no web of material closing the bore, has a significantly reduced column strength, which had been considered insufficient for use with thick stack high strength aluminium or other high strength light metal alloys in conjunction with low volume dies. However it has been established that with the combination of a rivet of such geometry, a low volume die and lubrication, a joint of a satisfactory quality can be produced with surprisingly low setting forces. The lower forces also mean that the possibility of the material of the lower sheet becoming embedded and retained in the die is reduced.

It will be appreciated that the depth and diameter of the die may be varied depending on the rivet size. In particular the die may have a die cavity with a maximum depth in the range 0.5 mm to 2.0 mm. It has been established that the die may have a volume this is 60% or even 70% or less of the effective solid volume of the rivet.

For the purposes of comparison with the joint of FIG. 1, FIGS. 2a to 2f show joints that have been produced in the same type and thickness of sheet material with a conventional, partly hollow, rivet in which the bore extends only part-way long the rivet shank so as to leave a web of material under the rivet head.

Figure 2A:
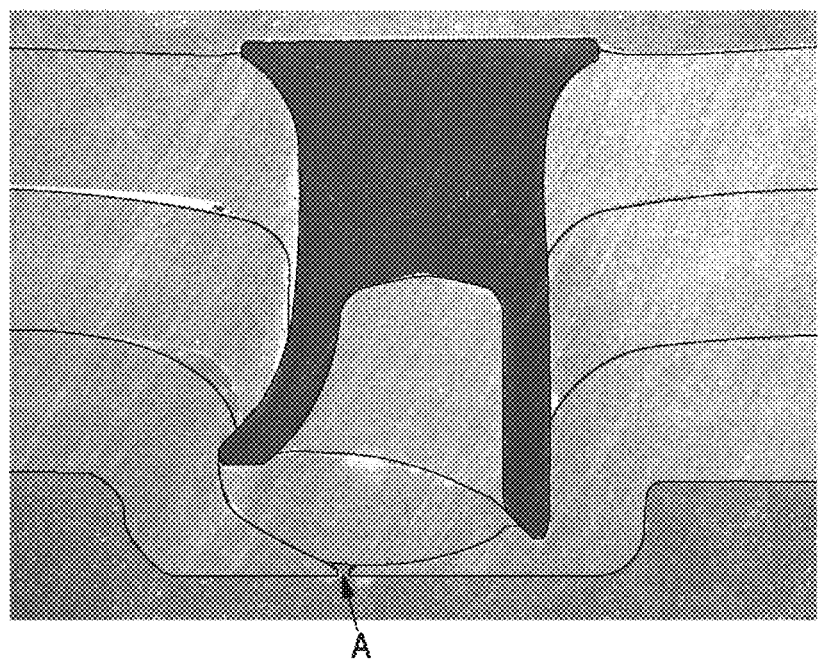
FIGS. 2a to 2e show sectioned and plan views of prior art joints using partially hollow self-piercing rivets, for the purposes of comparison with the joint of FIG. 1.

In FIG. 2a the rivet is of the same length and hardness as that of FIG. 1. The joint has been produced in the same manner as that of FIG. 1, with the same die and setting velocity. It can be seen that the rivet does not have sufficient column strength as it has flared asymmetrically in the joint. It has been established that this is as a result of the bore becoming prematurely full of the sheet material during the rivet insertion process such that the rivet flares and compresses. This results in a significantly reduced interlock, particularly on the left hand side in this example. The intermediate sheet has pushed through the lowermost sheet as indicated by arrow A thereby providing a path for moisture ingress and a potential for rivet corrosion. The head is not completely flush with the top surface of the upper sheet, which indicates that, unlike the joint shown in FIG. 1, a greater setting force is required. However, an increase in the setting force would not cure the problem of insufficient column strength. It will be appreciated by the skilled person that increasing the setting force is generally undesirable or impractical. In particular, such an increase involves greater energy consumption, the use of potentially larger force capacity riveting tools requiring large robots and greater expense as described in the introductory part of this specification. Moreover, simply increasing the setting force would only serve to increase the tendency for the rivet to collapse or flare asymmetrically.

Figure 2B:
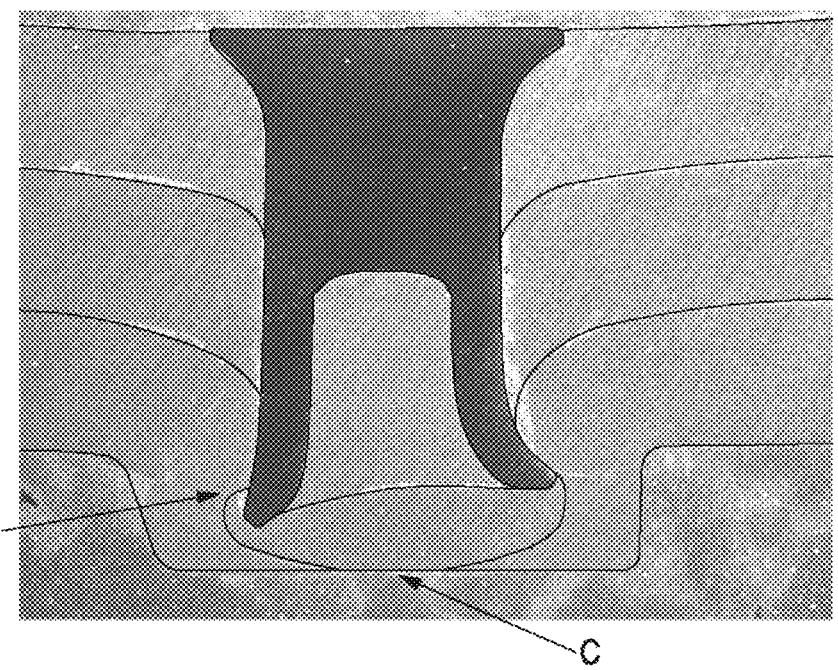

In FIG. 2b the only parameter that has changed compared to the joint of FIG. 2a is that the die depth has increased to 2.5 mm in an effort to accommodate more of the displaced sheet material. It can be seen that the rivet again has insufficient column strength to withstand the volume of material pushed into the bore, as it has flared asymmetrically. The increase in die depth has resulted in facture of the button (see arrow B) and has not reduced the tendency of the intermediate sheet to push through the lower sheet (see arrow C). Both these defects provide a potential source of corrosion. It has been realised by the inventor that increasing the depth of the die does not improve the joint when using sheet material that has lower ductility such as higher strength aluminium alloy.

Figure 2C:
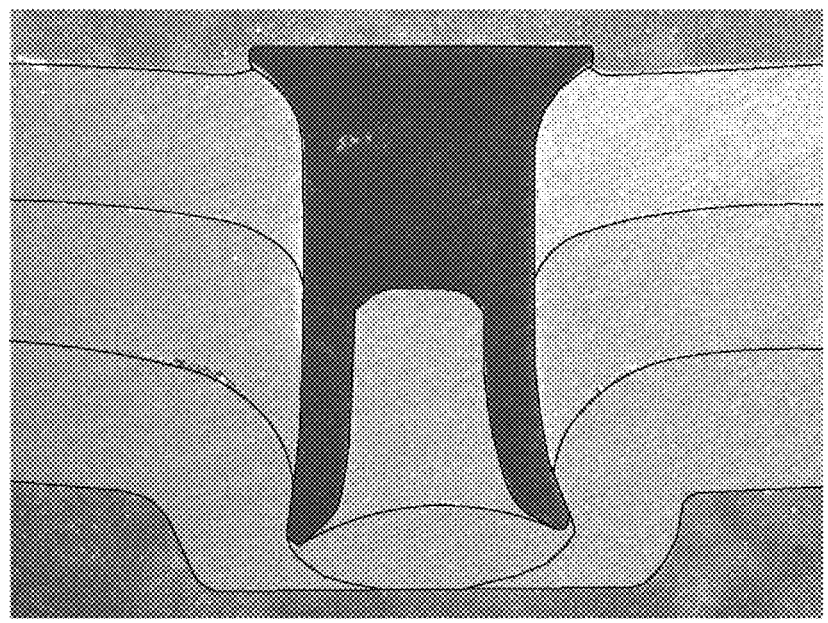

In FIG. 2c the only parameter that has changed compared to the joint of FIG. 2a is that the hardness level of the rivet has increased. It can be seen that the rivet exhibits increased column strength but some asymmetry is still apparent. The intermediate sheet has once again pushed through the lowermost sheet. The rivet provides minimal interlock in the lowermost sheet and the head stands proud of the upper surface of the uppermost sheet, indicating that a greater setting force is necessary (the undesirability of this will be apparent to the skilled person as discussed above). This joint is still not considered satisfactory for many applications.

Figure 2D:
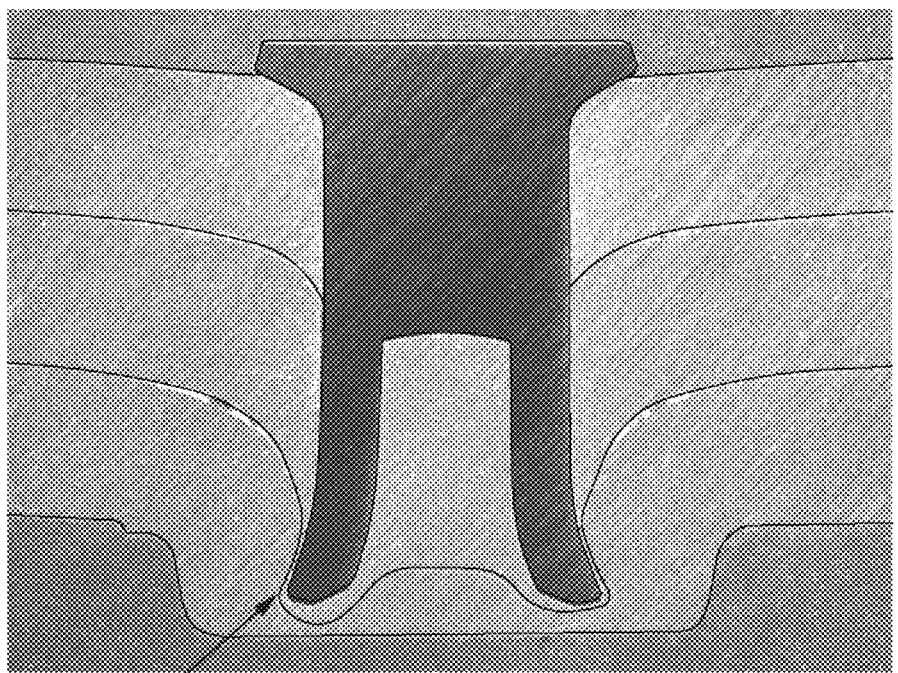
Figure 2E:
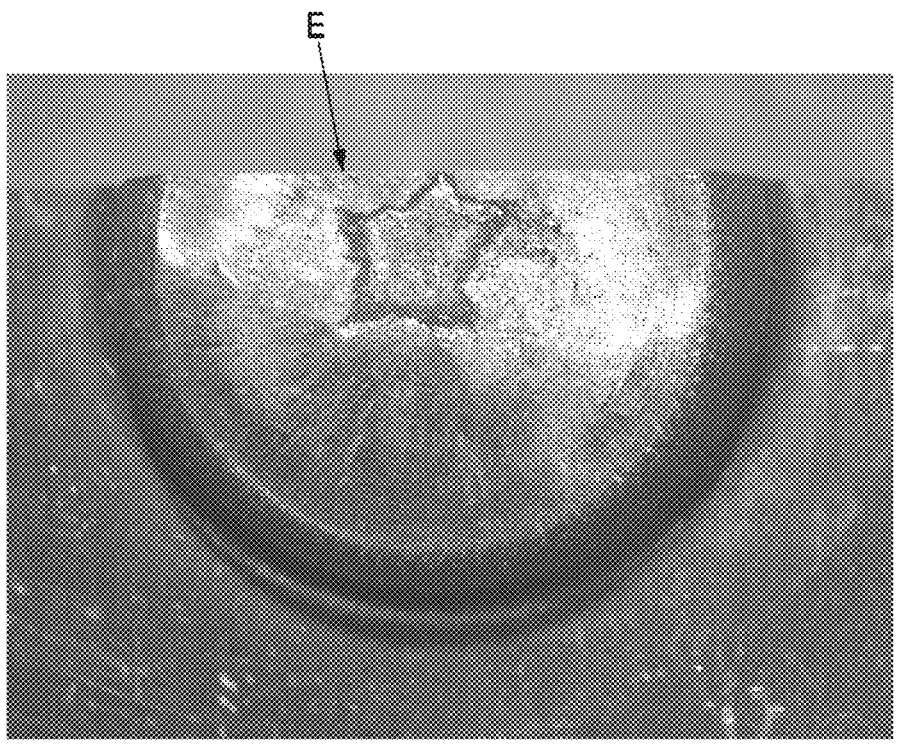

Referring now to FIGS. 2d and 2e, the only parameter that has changed compared to the joint of FIG. 2a is that the rivet exhibits increased column strength by virtue of its thicker legs. FIG. 2d is a sectioned view as before but FIG. 2e is a plan view of the lowermost sheet (after the joint has been cut through to produce the sectioned view of FIG. 2d). The intermediate sheet has been dragged down such that the sheet wraps around the piercing end and is not penetrated (see arrow D). This results in insufficient interlock. The rivet head also remains proud of the upper sheet again indicating that a greater setting force is required to set the rivet flush. The reduced volume of the bore also results in the intermediate sheet pushing through the lowermost sheet, as can be seen from arrow E in FIG. 2e.

Figure 3A:
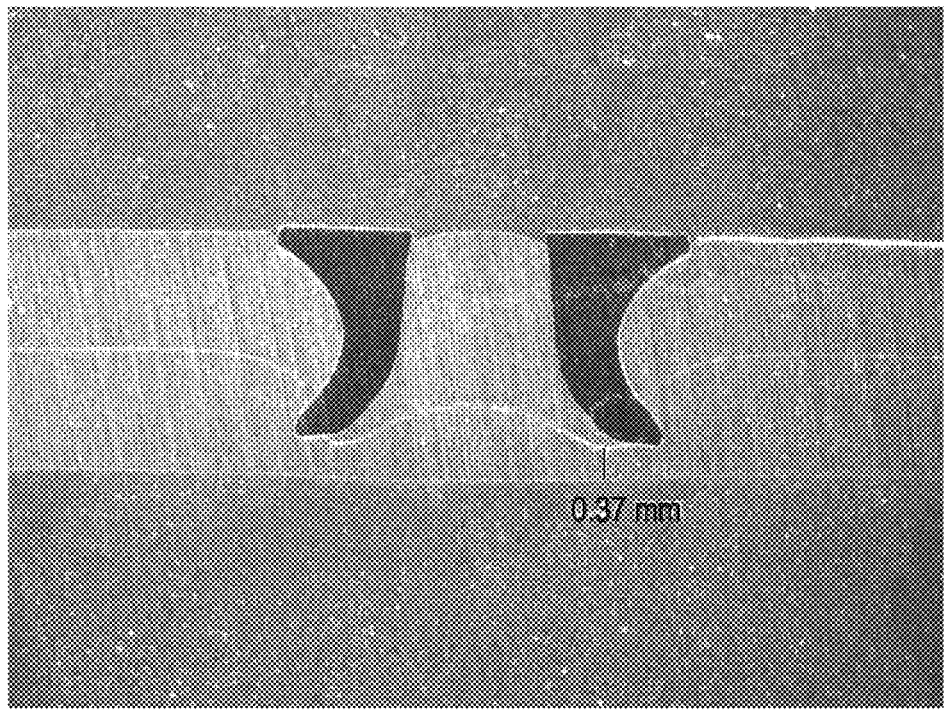
FIGS. 3a and 3b show sectioned views through two riveted joints prepared for comparative purposes: one using a self-piercing riveting method according to the prior art and the other using a self-piercing rivet method in accordance with a second embodiment of the present invention.

The present invention also has application to thin stacks of aluminium alloys. FIG. 3a shows a joint produced in two sheets of aluminium alloy NG5754, each having a thickness of 1.5 mm. In such stacks the vast majority of the displaced sheet material can be accommodated in the bore of the rivet and so the joint has been produced using a substantially flat die, resulting in the absence of a button on the die side of the material. The rivet is fully hollow and has an outside shank diameter of 3.35 mm (+/−0.1 mm) and a bore diameter of 2.1 mm (+/−0.1 mm). It will be seen that the joint is virtually flush on both the upper and lower surfaces, which is particularly desirable for certain joints such as, for example, those that are particularly prominent in the finished article or where out-of-plane deformation of the lowermost sheet and/or the complete joint cannot be accommodated or would not be visually acceptable. The minimum thickness of the lowermost sheet is 0.37 mm, which is considered within the bounds of a satisfactory joint in most applications.

Figure 3B:
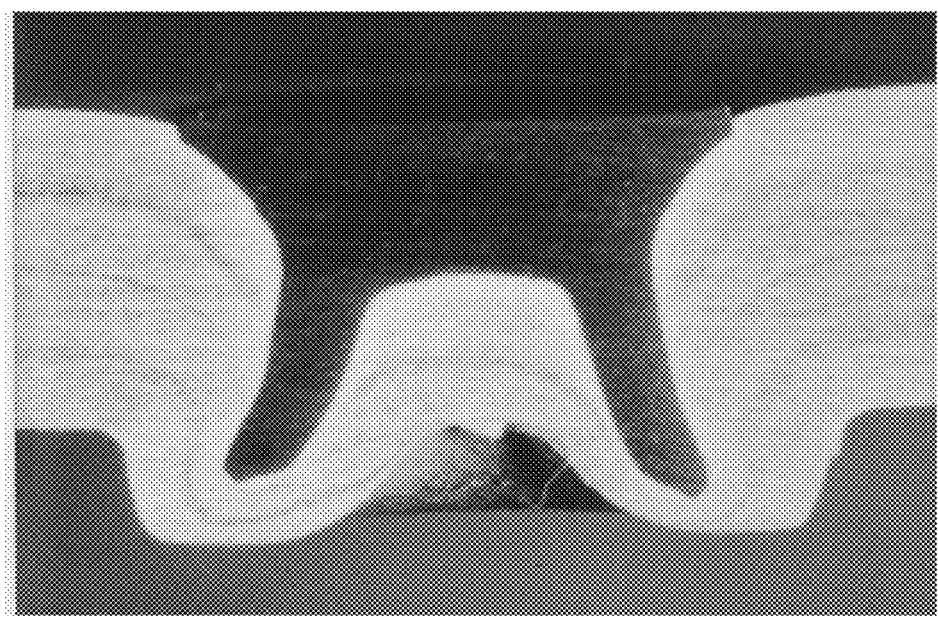

For comparison FIG. 3b illustrates a standard joint used in the automotive industry for such material and that has been produced using a comparable conventional partly hollow rivet. It will be seen that the die side of the joint has a significant button deformation.

Figure 4C:
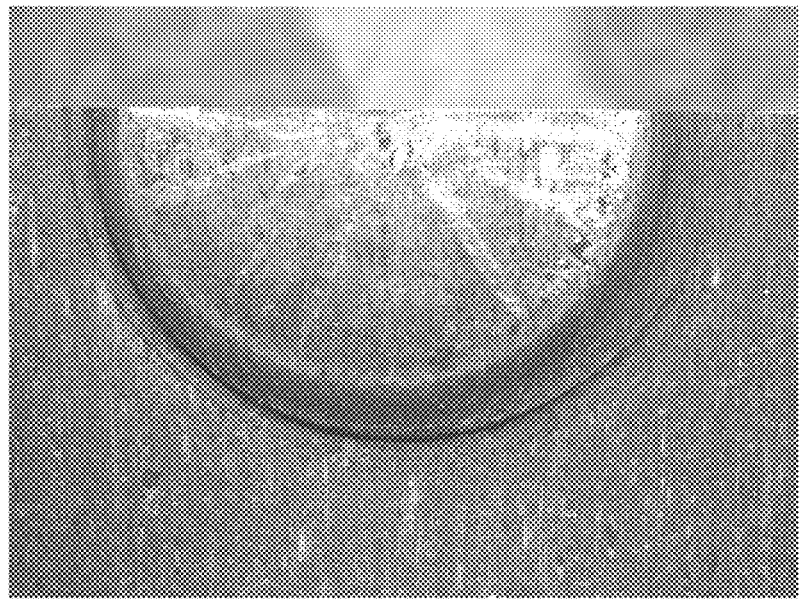
Figure 4D:
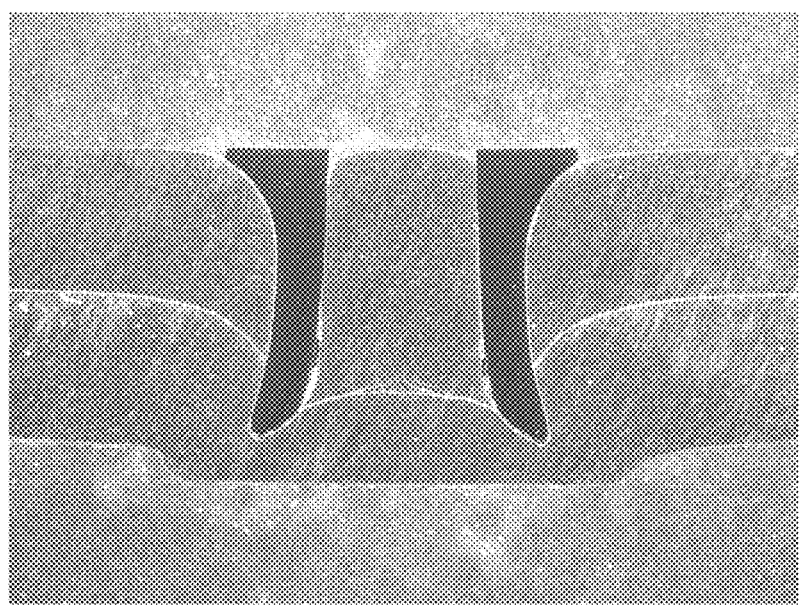

FIGS. 4a-4d show joints that have been produced in wrought magnesium alloy AZ31 B-0. Such material has a particularly low ductility and is therefore difficult to join using self-piercing riveting methods. A first joint, shown in FIGS. 4a (plan view) and 4b (sectioned view) has been produced using a partly hollow rivet and a die having a depth of 1.6 mm. The internal bore of the rivet has been lubricated in the same manner as the rivet used in the joint of FIG. 1. It can be seen from arrows F and G that the button exhibits cracking and tearing rendering the joint prone to corrosion. Moreover, there is a lack of interlock in the joint rendering it relatively weak. Simply reducing the die volume in an attempt to reduce the size of the button has been found to cause rivet collapse or a joint in which the rivet is not flush with the upper surface of the upper sheet. In contrast a successful joint has been produced using a fully hollow rivet with a low volume die of maximum depth 0.75 mm, as shown in FIGS. 4c and 4d. No cracks or tears in the button are evident and the piercing end of the rivet has penetrated the upper sheet with sufficient flaring so as to provide good interlock in the lower sheet.

The use of a fully hollow rivet in the method of the present invention permits the use of a die of significantly lower volume than compared to that used in conventional self-piercing riveting methods, without fear of the rivet collapsing or flaring in an asymmetric manner. Such low volume dies would be considered too small for use with conventional rivets for joining the same sheet materials. The volume of the die used in the method of the present invention may have a volume anywhere between 30% and 100% lower than that used in a conventional self-piercing riveting process.

The die volume may be anywhere between 0% and 60% or even 70% of an equivalent solid rivet volume (i.e. a rivet having the same dimensions as the fully hollow rivet used to make the joint of the present invention, but which was completely solid). This compares to dies used in conventional self-piercing riveting processes (with partly hollow rivets) that are typically above 60% of the equivalent solid volume rivet.

In one embodiment, for example, the die may have a maximum depth of 2 mm and a diameter of 10 mm.

Any suitable lubricant may be used such as, for example, a dry (solid) film lubricant. The lubricant may be applied along the full length of the rivet bore or just part thereof. It may also be applied, in some applications, to the exterior surface of the rivet shank.

An advantage of using a fully hollow rivet having a shank with an outside diameter of 5.3 mm (+/−0.1 mm) is that it may be used with standard rivet setters, dies, rivet feeders and other tooling used to make self-piercing rivet joints. This means the same equipment may be used to insert both conventional partly hollow and fully hollow rivets.

Joints in accordance with the present invention may be produced using significantly lower setting forces than those for conventional rivets. Moreover, the rivets provide for a reduced weight in the final assembled product and through imparting reduced distortion allow joints to be produced in restricted areas such as, for example, narrow flanges.

The rivet used in the method of the present invention may have an outside shank diameter of less than 5.3 mm (+/−0.1 mm). Furthermore it may be used to join stacks that have a thickness of 3 mm or less, including a stack having a thickness of 1 mm.

The use of a lubricant on the rivet means that when lower volume dies are used the joints can be made at standard or conventional setting force of less than 50 kN, even when the rivet has a countersunk head. When setting such a rivet a large proportion of the setting force is required to embed the underside of the head into the upper sheet thereby ensuring that the head is substantially flush with the upper surface of the upper sheet (as seen in FIG. 1).

The term "light metal alloys" is recognised in the industry and is used herein to mean magnesium, titanium, beryllium or high strength aluminium alloys, which all have a low density and high strength to weight ratios.

The ultimate tensile strength (UTS) of wrought magnesium alloys is typically in the range of 180-440 MPa, whereas the UTS of high strength aluminium alloys is typically in the range 330-600 MPa.

FIGS. 5a-5c illustrate how a slug 11 of the upper sheet material is retained in the bore of the rivet. FIG. 5b is a magnified view of the upper part of FIG. 5a and shows that the internal surface of the rivet has an annular groove 12 defined at its upper end. The slug has deformed outwardly to occupy the groove thereby preventing it from becoming dislodged from the upper end of the bore. In the embodiment shown the groove is annular but will be appreciated that the groove may be partly annular or may take any other suitable form.

In this exemplary embodiment the joint has been produced using a stack of four sheets of high strength aluminium alloy AC600-T4 material, the upper sheet being relatively thin (0.9 mm). The next sheet down is 2 mm thick and the other two sheets are 3 mm thick. As before, the rivet has been inserted using an electric rivet setter of the kind described in U.S. Pat. No. 6,951,052 and using a clamping regime described in U.S. Pat. No. 6,742,235. The joint has been formed using a die with a maximum depth of 1.8 mm and having a diameter of 10 mm. The setting velocity was 350 mm/sec.

FIG. 5c shows a joint produced with the same rivet with a punch 13 (that inserts the rivet) that has a projection 14 to encourage deformation of the slug material into the groove 12.

In some applications the die may have a volume that is 60-70% of the effective solid volume of the rivet.

The invention claimed is:

1. A method for forming a joint in a stack of at least two sheets of material, at least one of the sheets being a light metal alloy, using a self-piercing rivet comprising the steps of: positioning the material over a die; providing a substantially cylindrical self-piercing rivet that is fully hollow so as to define a bore that extends along its entire length, the rivet having been coated at least along a portion of its bore by a lubricant; positioning the rivet over the sheet material at a position opposite the die; using a punch to set the rivet and force it into the sheet material such that it pierces an upper surface thereof and such that a shank of the rivet deforms outwardly to interlock with the material but without penetration to the die side of the material; wherein the rivet has a shank with an outside diameter of 5.4 mm or less, and the die has a volume that is 60% or less of an effective solid volume of the rivet.

2. A method according to claim 1, where the sheets have an ultimate tensile strength in the range of 50-600 MPa.

3. A method according to claim 1, wherein the sheets have an ultimate tensile strength in the range of 180 MPa-600 MPa.

4. A method according to claim 1, wherein the die has a die cavity having a maximum depth in the range of 0.5 mm to 2.0 mm.

5. A method according to claim 1, in which the stack of sheet material has a thickness of at least 6.0 mm.

6. A method according to claim 1, in which the stack of sheet material has a thickness of at least 1.0 mm.

7. A method according to claim 1, wherein the rivet is coated with lubricant along a full length of its bore.

8. A method according to claim 7, wherein the rivet is further coated with lubricant on at least part of an exterior surface of a shank of the rivet.

9. A method according to claim 1, wherein the lubricant is a dry film.

10. A method according to claim 1, wherein the sheet material is high strength aluminum alloy having an ultimate tensile strength in the range of 330-600 MPa.

11. A method according to claim 1, wherein the sheet material is wrought magnesium alloy having an ultimate tensile strength in the range of 180-440 MPa.

12. A method according to claim 1, wherein a diameter of the bore of the rivet is at least 3.1 mm.

13. A method according to claim 1, wherein an outside diameter of the shank is 3.36 mm or less.

14. A method according to claim 13, wherein an inside diameter of the bore of the rivet is at least 2.0 mm.

15. A method according to claim 1, wherein the rivet has a countersunk head.

16. A method according to claim 1, wherein the rivet has at least one formation at an upper portion of the bore, the method including allowing the sheet material to deform such that a slug of material from the upper sheet and inside the bore engages with said at least one formation.

17. A method according to claim 1, wherein the at least one formation comprises a groove or recess.

18. A method according to claim 17, further comprising using a punch to insert the rivet into the sheet material, the punch having a projection that contacts the slug of material so as to deform it outwardly.

19. A method for manufacturing a component or product including forming a joint in accordance with the method of claim 1.

20. A method for forming a joint in a stack of at least two sheets material, at least one of the sheets being a light metal alloy, using a self-piercing rivet comprising the steps of: positioning the material over a die; providing a substantially cylindrical self-piercing rivet that is fully hollow so as to define a bore that extends along its entire length, the rivet having been coated at least along a portion of its bore by a lubricant; positioning the rivet over the sheet material at a position opposite the die; using a punch to set the rivet and force it into the sheet material such that it pierces an upper surface thereof and such that a shank of the rivet deforms outwardly to interlock with the material but without penetration to the die side of the material; wherein the die has a volume that is 70% or less of an effective solid volume of the rivet.

21. A method according to claim 20, wherein the die volume is 60% or less of the effective solid volume of the rivet.

22. A method for manufacturing a component or product including forming a joint in accordance with the method of claim 20.

\* \* \* \* \*